(12) United States Patent
Narum et al.

(10) Patent No.: US 12,235,764 B2
(45) Date of Patent: Feb. 25, 2025

(54) LBAT BULK UPDATE

(71) Applicant: Micron Technology, Inc., Boise, ID (US)

(72) Inventors: Steven R. Narum, Meridian, ID (US); Brian Toronyi, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 17/946,960

(22) Filed: Sep. 16, 2022

(65) Prior Publication Data

US 2023/0393981 A1 Dec. 7, 2023

Related U.S. Application Data

(60) Provisional application No. 63/348,127, filed on Jun. 2, 2022.

(51) Int. Cl.
| | | |
|---|---|---|
| *G06F 12/10* | (2016.01) | |
| *G06F 12/02* | (2006.01) | |
| *G06F 12/0804* | (2016.01) | |
| *G06F 12/1027* | (2016.01) | |

(52) U.S. Cl.
CPC ...... *G06F 12/0804* (2013.01); *G06F 12/0246* (2013.01); *G06F 12/1027* (2013.01)

(58) Field of Classification Search
CPC ............ G06F 12/0246; G06F 12/0804; G06F 12/1027
USPC .......................................... 711/118, 206–209
See application file for complete search history.

(56) References Cited

U.S. PATENT DOCUMENTS

| | | | |
|---|---|---|---|
| 8,578,122 B2 | 11/2013 | Coker et al. | |
| 9,146,683 B2 | 9/2015 | Wei et al. | |
| 10,199,066 B1 | 2/2019 | Feldman | |
| 11,550,658 B1 * | 1/2023 | Walsh | G06F 12/0246 |
| 2018/0089076 A1 * | 3/2018 | Li | G06F 3/0665 |
| 2018/0284995 A1 * | 10/2018 | Dantkale | G06F 12/0868 |
| 2021/0223979 A1 * | 7/2021 | Li | G06F 3/061 |

* cited by examiner

*Primary Examiner* — Ilwoo Park
(74) *Attorney, Agent, or Firm* — Brooks, Cameron & Huebsch, PLLC

(57) ABSTRACT

Apparatus and methods include receiving signaling indicative of performance of an operation to update a plurality of data entries written to a memory device and having a same offset from an initial physical address corresponding to each of the plurality of data entries and performing the operation to write the update to the plurality of data entries written to the memory device and having the same offset from the initial physical address corresponding to each of the plurality of data entries responsive to receiving the signaling indicative of performance of the operation to update the plurality of data entries.

20 Claims, 4 Drawing Sheets

400

RECEIVE, BY A PROCESSING DEVICE RESIDENT ON A LOGICAL BLOCK ADDRESS TRANSLATION (LBAT) ACCELERATION COMPONENT, SIGNALING INDICATIVE OF PERFROMANCE OF AN OPERATION TO UPDATE A PLURALITY OF DATA ENTRIES WRITTEN TO A MEMORY DEVICE AND HAVING A SAME OFFSET FROM AN INTIAL PHYSICAL ADDRESS CORRESPONDING TO EACH OF THE PLURALITY OF DATA ENTRIES — 441

PERFORM THE OPERATION TO WRITE THE UPDATE TO THE PLURALITY OF DATA ENTRIES WRITTEN TO THE MEMORY DEVICE AND HAVING THE SAME OFFSET FROM THE INITIAL PHYSICAL ADDRESS CORRESPONDING TO EACH OF THE PLURALITY OF DATA ENTRIES RESPONSIVE TO RECEIVING THE SIGNALING INDICATIVE OF PERFORMANCE OF THE OPERATION TO UPDATE THE PLURALITY OF DATA ENTRIES — 442

LBAT BULK UPDATE

PRIORITY INFORMATION

This application claims the benefit of U.S. Provisional Application Ser. No. 63/348,127 filed on Jun. 2, 2022, the contents of which are incorporated herein by reference.

TECHNICAL FIELD

Embodiments of the disclosure relate generally to memory sub-systems, and more specifically, relate to LBAT bulk update of memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
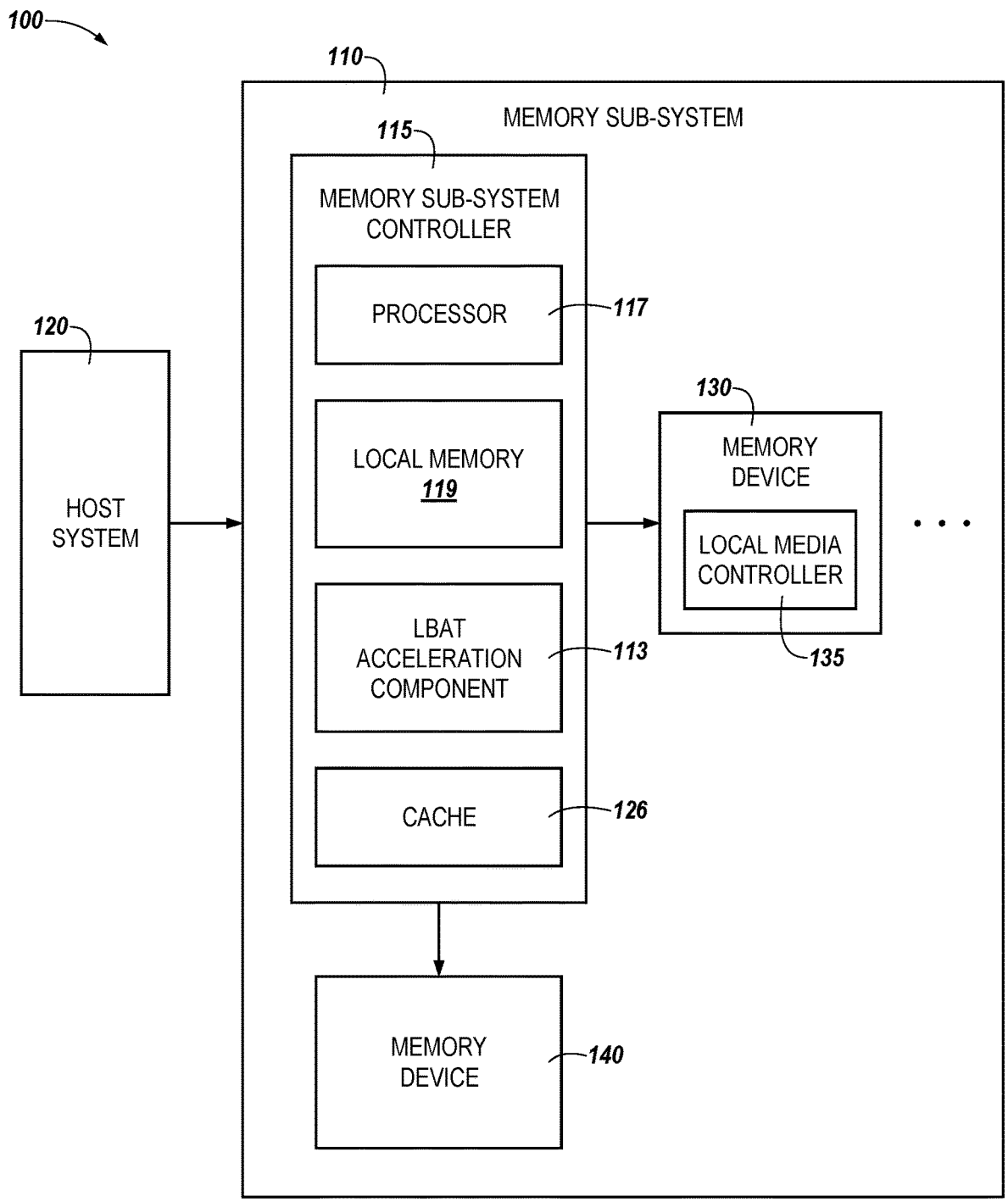
FIG. 1 illustrates an example computing system that includes a memory sub-system in accordance with some embodiments of the present disclosure.

Aspects of the present disclosure are directed logic block address translation (LBAT) bulk update, in particular to memory sub-systems that include a LBAT acceleration component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

A memory device can also be a volatile memory device. A volatile memory device can include a memory array, which can be a dynamic random access memory (DRAM) array, SRAM array, STT RAM array, PCRAM array, TRAM array, and/or RRAM array, for instance. In general, a volatile memory device stores data while the memory device is powered but generally does not store data when the memory device is powered down or is powered off.

During operations of a memory sub-system, an LBAT component can be used to help update storage. The LBAT maintains the logical address to physical address lookup table (L2P) for a storage device. The L2P can have the flash logic address (FLA) of the user data. All read and write operations for the storage device can go through the LBAT. The LBAT can consist of volatile memory, for example DRAM. The LBAT can be DRAM codeword aware and implement an internal cache. The LBAT can write to DRAM which may guarantee atomic level accuracy with logical to physical updates that cross codewords.

The LBAT component can receive an incoming logical value, pass the value into the L2P table to find the FLA where the data was stored (i.e., the physical location of the data stored in the non-volatile memory). In other words, the LBAT component includes the L2P table that has the physical location of user data stored in NAND.

In some approaches each data entry may be read and written back to effect the data change for a particular portion of the user data in each location in which the user data was stored. In such approaches it can therefore be impossible to update all the locations where the user data resides in a memory device (or portion thereof) using a single read and write operation. For example, in such approaches, updated user data is generally read from each entry location and the updated user data for each entry location is rewritten elsewhere. Accordingly, a subsequent read and write operation are generally performed to update the next location where the user data was stored. Performing a read and write operation for each fixed dataset can take longer than desired time periods to complete the update to the user data in each location the user data is stored. As a result, the larger the update or the more entry points of the user data to be updated may result in longer wait time for the update to occur.

Aspects of the present disclosure address the above and other deficiencies by updating all fixed data sets in one read/write operation using an LBAT acceleration component. The LBAT acceleration component can take advantage of its cache of DRAM to update all entries of a codeword with a single read and write of DRAM. This allows the LBAT acceleration component described herein to write a constant data pattern by providing sequential address range and a fixed data option. The LBAT acceleration component can be aware that it is reading across multiple sequential entries and can make the same change to all of the sequential entries without performing multiple read and write operations. The LBAT acceleration component can set a write mask or not set a write mast to identify the portion of user data that is being updated, as described in more detail herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache 126 or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a logical block address translation (LBAT) acceleration component 113. In some embodiments, the LBAT component 113 can include the cache 126 for storing logical block addresses of data stored in memory devices 130 or 140.

In some embodiments, the memory sub-system controller 115 includes at least a portion of the LBAT acceleration component 113. For example, the memory sub-system controller 115 can include a processor 117 (processing device) configured to execute instructions stored in local memory 119 for performing the operations described herein. In some embodiments, the LBAT acceleration component 113 is part of the host system 110, an application, or an operating system.

In a non-limiting example, an apparatus (e.g., the computing system 100) can include a memory sub-system LBAT acceleration component 113. The LBAT acceleration component 113 can be resident on the memory sub-system 110. As used herein, the term "resident on" refers to something that is physically located on a particular component. For example, the LBAT acceleration component 113 being "resident on" the memory sub-system 110 refers to a condition in which the hardware circuitry that comprises the LBAT acceleration component 113 is physically located on the memory sub-system 110. The term "resident on" can be used interchangeably with other terms such as "deployed on" or "located on," herein.

The LBAT acceleration component can be configured to receive signaling indicative of performance of an operation to update a plurality of data entries written to a memory device and having the same offset from an initial physical address corresponding to each of the plurality of data entries. As described above, the memory device can include memory dice or memory packages that form at least a portion of the memory device 140. For example, the LBAT acceleration component 113 can receive a signal to update certain user data stored in memory device 130 or 140. The user data stored in the memory device may reside in several physical storage locations (e.g., more than one row, column, block, page, etc. of memory) within the memory device. Each physical storage location in which the user data is located may need to be updated based on the signaling received.

The LBAT acceleration component 113 can be further configured to perform the operation to write the update to the plurality of data entries written to the memory device and have the same offset from the initial physical address corresponding to each of the plurality of data entries responsive to receiving the signaling indicative of performance of the operation to update the plurality of data entries. For example, the LBAT acceleration component 113 can update the user data as desired in each physical storage location in which the user data is stored within the memory device.

The LBAT acceleration component 113 can also perform the operation to write the update to the plurality of data entries written to the memory device and having the same offset from the initial physical address corresponding to each of the plurality of data entries in the absence of receipt of signaling subsequent to the signaling indicative of performance of the operation to update a plurality of data entries written to the memory device and having the same offset from the initial physical address corresponding to each of the plurality of data entries. For example, instead of updating each location of the user data stored in the memory device by reading and writing the update each time with an additional signal, the LBAT acceleration component can update all the locations of the desired user data using one read and one write operation.

In some embodiments, the LBAT acceleration component 113 can perform the operation to write the update to the plurality of data entries written to the memory device 140 and having the same offset from the initial physical address corresponding to each of the plurality of data entries such that a subset of bits of each of the plurality of data entries written to the memory device 140 and having the same offset from the initial physical address corresponding to each of the plurality of data entries are updated.

In some embodiments, the LBAT acceleration component 113 can be coupled to a cache 126. The cache 126 may also be resident on the LBAT acceleration component 113. In another embodiment, the LBAT acceleration component 113 can mark (e.g., flag or otherwise provide identifying information to) each data entry of the plurality of data entries written to the memory device 140 and having the same offset from the initial physical address using a write mask data value. For example, the LBAT acceleration component 113 can mark each data entry with a fixed constant that identifies the portion or the user data to be updated. The LBAT acceleration component 113 can then identify the portion of the user data to be updated during the write operation by using the write mask as a marker.

In another non-limiting example, a system (e.g., the computing system 100) can include a memory sub-system 110. A logical block address translation (LBAT) acceleration component 113 can be resident on the memory sub-system 110. A processor device 117 can be resident on the on memory sub-system 110. The processor device 117 is configured to receive signaling to update a plurality of fixed data sets corresponding to a sequential range of data addresses in a memory device.

In some embodiments, the processor device 117 can further be configured to read the sequential range of data addresses in the memory device and write the update to the plurality of the fixed data sets in the sequential range of data addresses in the memory device. The system can further be configured to write the update to the plurality of fixed data sets in the absence of receiving signaling subsequent to the signaling to update the plurality of fixed data sets. In some embodiments, the processor device 117 can further mark the fixed data sets in the sequential range of data addresses in the memory device using a write mask data value.

In some embodiments, the LBAT acceleration component 113 can be aware that user data entries cross codewords (cross codeword 332 in FIG. 3) and can ensure that the updated user data is written correctly atomically in the memory. That is, the LBAT acceleration component 113 can, in some embodiments, determine that one or more data entries include a codeword that spans one or more memory dice or memory packages. For example, if the user data being updated crosses between two L2P entry, the LBAT acceleration component can be aware that the user data being updated is partially in a first codeword and partially in a second codeword and can ensure that the update is atomically correct in both the first and second codeword portions. Atomically correct can mean that only one read or right operation can be performed at a time. The first read operation would have to finish before the write operation can start. This can ensure that the update of user data is correct when more than one user is updating the user data.

Figure 2:
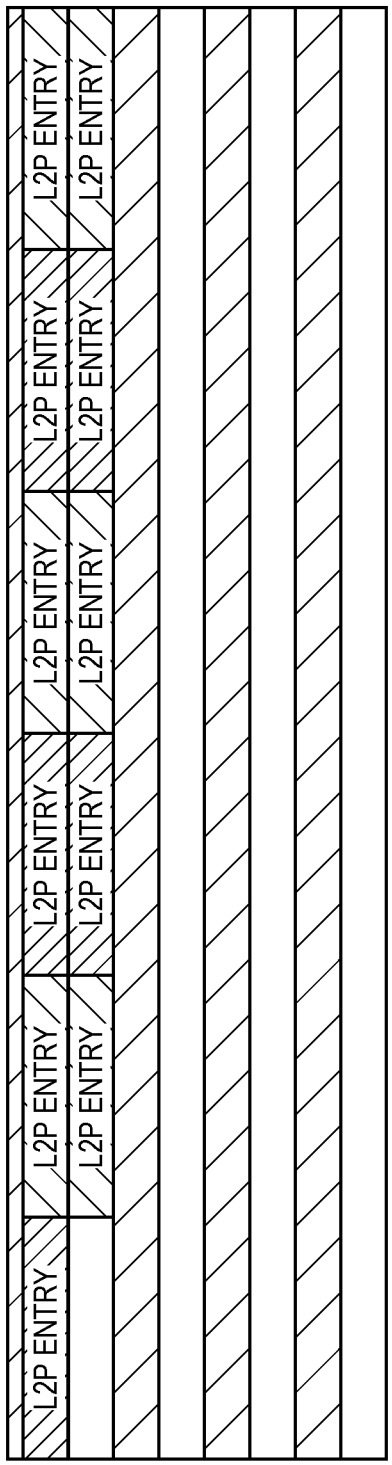
FIG. 2 is a block diagram of an example of a memory portion of a cache component in accordance with some embodiments of the present disclosure.

FIG. 2 is a block diagram of an example of a memory portion of a cache component in accordance with some embodiments of the present disclosure. Although not shown in FIG. 2 so as to not obfuscate the drawings, the LBAT acceleration component, which can be analogous to the LBAT acceleration component 113 of FIG. 1, can include hardware circuitry (e.g., one or more processors, logic circuitry, etc.) to perform the operations described herein. The memory portion of the cache 126 can include the logic address to physical address (i.e., flash logic address (FLA)) look-up table (e.g., a logical-to-physical (L2P) table) for the user data stored in a memory device (e.g., memory device 140 of FIG. 1). Accordingly, the memory portion of the cache illustrated in FIG. 2 can be a collection of storage locations, such as a cache, or other such grouping of memory cells.

In some embodiments, the LBAT acceleration component can move through the L2P table located in the cache 226 and identify the codeword that corresponds to the portion of data to be updated in the memory device (i.e., the memory device 140 in FIG. 1). Using the L2P value of the portion of data to update in the memory device, the LBAT acceleration component can then know the physical location of the user data in the memory device. The user data physical location within the memory device may be stored in a plurality of locations within the L2P table. This is because the user data may be stored in a plurality of physical locations within the memory device. The LBAT acceleration component can read sequentially through the L2P table located in the cache 226 identifying each physical location of the user data from one read operation. The LBAT acceleration component can then write the update to all the plurality of data entries in the memory device utilizing one write operation.

Figure 3:
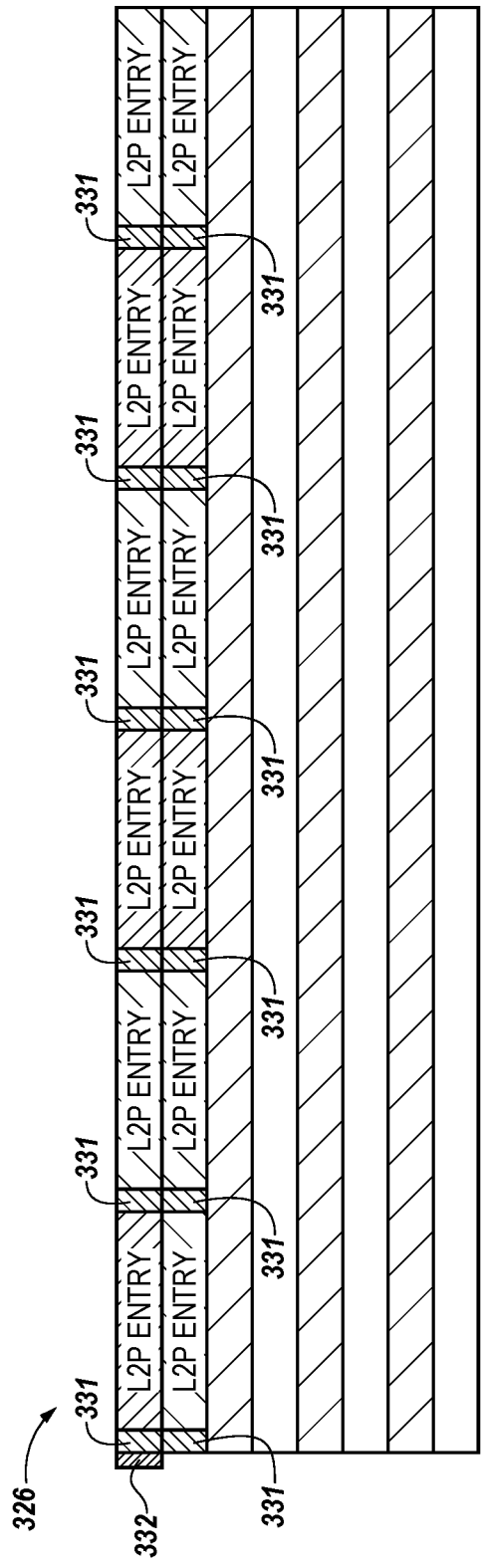
FIG. 3 is a block diagram of an example of a memory portion of a cache component in accordance with some embodiments of the present disclosure.

FIG. 3 is a block diagram of an example of a memory portion of a cache component in accordance with some embodiments of the present disclosure. The cache 326 can include the logic address to physical address (i.e., flash logic address (FLA)) look-up table (L2P) for the user data stored in a memory device (e.g., memory device 140 of FIG. 1).

In some embodiments, the LBAT acceleration component can move through the L2P table located in the cache 326 and identify the codeword that corresponds to the portion of data to be updated in the memory device (i.e., the memory device 140 in FIG. 1). Using the L2P value of the portion of data to be updated in the memory device, the LBAT acceleration component can then know the physical location of the user data in the memory device. The user data physical location within the memory device may be stored in a plurality of locations within the L2P table. This is because the user data may be stored in a plurality of physical locations within the memory device. The LBAT acceleration component can read sequentially through the L2P table located in the cache 326 identifying each physical location of the user data from one read operation. The LBAT acceleration component can then write the update to all of the plurality of data entries in the memory device utilizing one write operation.

In some embodiments, the LBAT acceleration component can mark each location of the user data to be updated using a write mask value 331. The write mask value 331 can be a fixed constant of bits. The write mask value 331 can be used to identify the location of the desired L2P value in the cache 326 of the user data to be updated. For example, the LBAT acceleration component can read the L2P lookup table located in the cache 326 and deposit a write mask at the location of the translation from logical to physical location for each of the plurality of entries that consist of the user data to be updated.

In some embodiments, the LBAT acceleration component 113 can be aware that user data entries cross codewords boundaries 332. The user data to be updated may cross codeword boundaries 332. For example, if the user data being updated crosses between two L2P entries, the LBAT acceleration component can be aware that the user data being updated is partially in a first codeword and partially in a second codeword and can ensure that the update is atomically correct in both the first and second codeword portions across codeword boundary 332.

Figure 4:
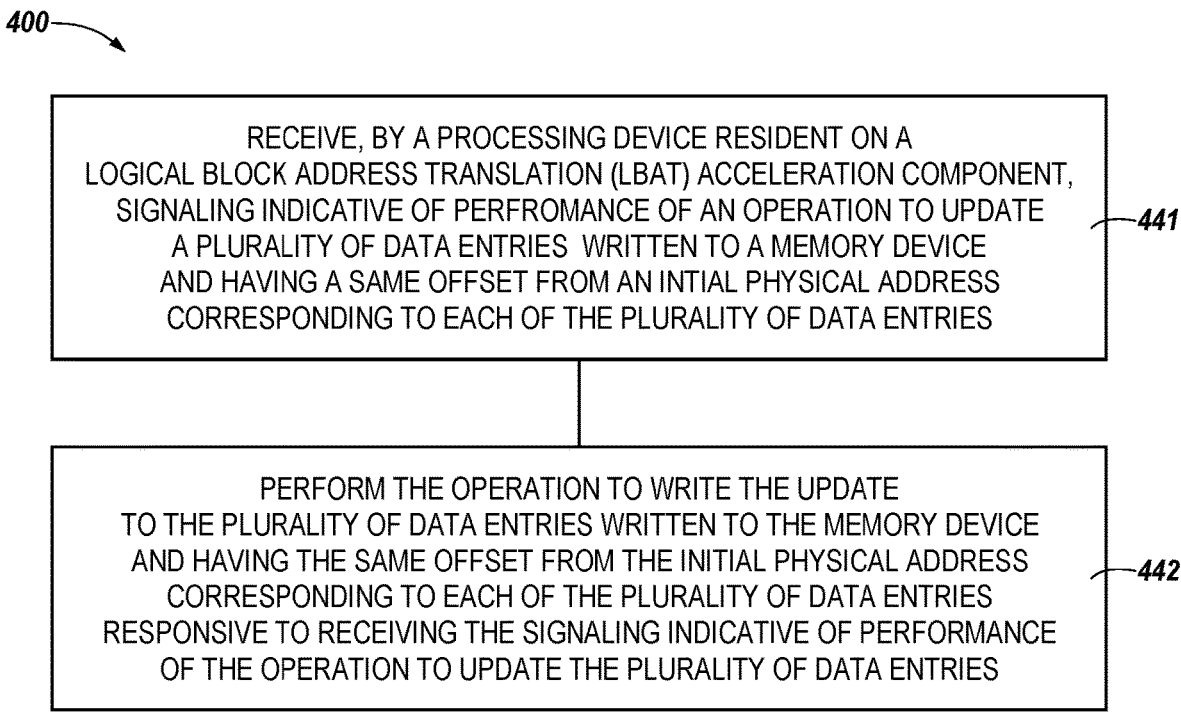
FIG. 4 is a flow diagram corresponding to a method of memory bulk update using an LBAT acceleration component in accordance with embodiments of the present disclosure.

FIG. 4 is a flow diagram corresponding to a method 400 for bulk memory update using an LBAT acceleration component in accordance with embodiments of the present disclosure. The method 400 can be performed by processing logic that can include hardware (e.g., processor device, circuitry, dedicated logic, programmable logic, microcode, hardware of a device, integrated circuit, etc.), software (e.g., instructions run or executed on a processing device), or a combination thereof. In some embodiments, the method 400 can be performed by the LBAT acceleration component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 441, signaling can be received by a processing device resident on a logical block address translation (LBAT) acceleration component indicative of performance of an operation to update a plurality of data entries written to a memory device and having a same offset from an initial physical address corresponding to each of the plurality of data entries. In some embodiments, the LBAT acceleration component can be analogous to the LBAT acceleration component 113 illustrated in FIG. 1.

At operation 442, an operation can be performed to write the update to the plurality of data entries written to the memory device and having the same offset from the initial physical address corresponding to each of the plurality of data entries responsive to receiving the signaling indicative of performance of the operation to update the plurality of data entries.

In some embodiments, the method 400 can include performing the operation to write the update to the plurality of data entries written in the memory device and having the same offset from the initial physical address corresponding to each of the plurality of data entries in the absence of receipt of signaling subsequent to the signaling indicative of performance of the operation to update a plurality of data entries written to the memory device and having the same offset from the initial physical address corresponding to each of the plurality of data entries.

In some embodiments, the method 400 can include performing the operation to write the update to the plurality of data entries written to the memory device and having the same offset from the initial physical address corresponding to each of the plurality of data entries such that a subset of bits of each of the plurality of data entries written to the memory device and having the same offset from the initial physical address corresponding to each of the plurality of data entries are updated.

In some embodiments, the method 400 can include the processing device (or LBAT acceleration component 113 in FIG. 1) being coupled to a cache. In another embodiment of method 400, the cache is resident on the LBAT acceleration component.

In some embodiments, the method 400 can include marking each data entry of the plurality of data entries written to the memory device and having the same offset from the initial physical address using a write mask data value.

Figure 5:
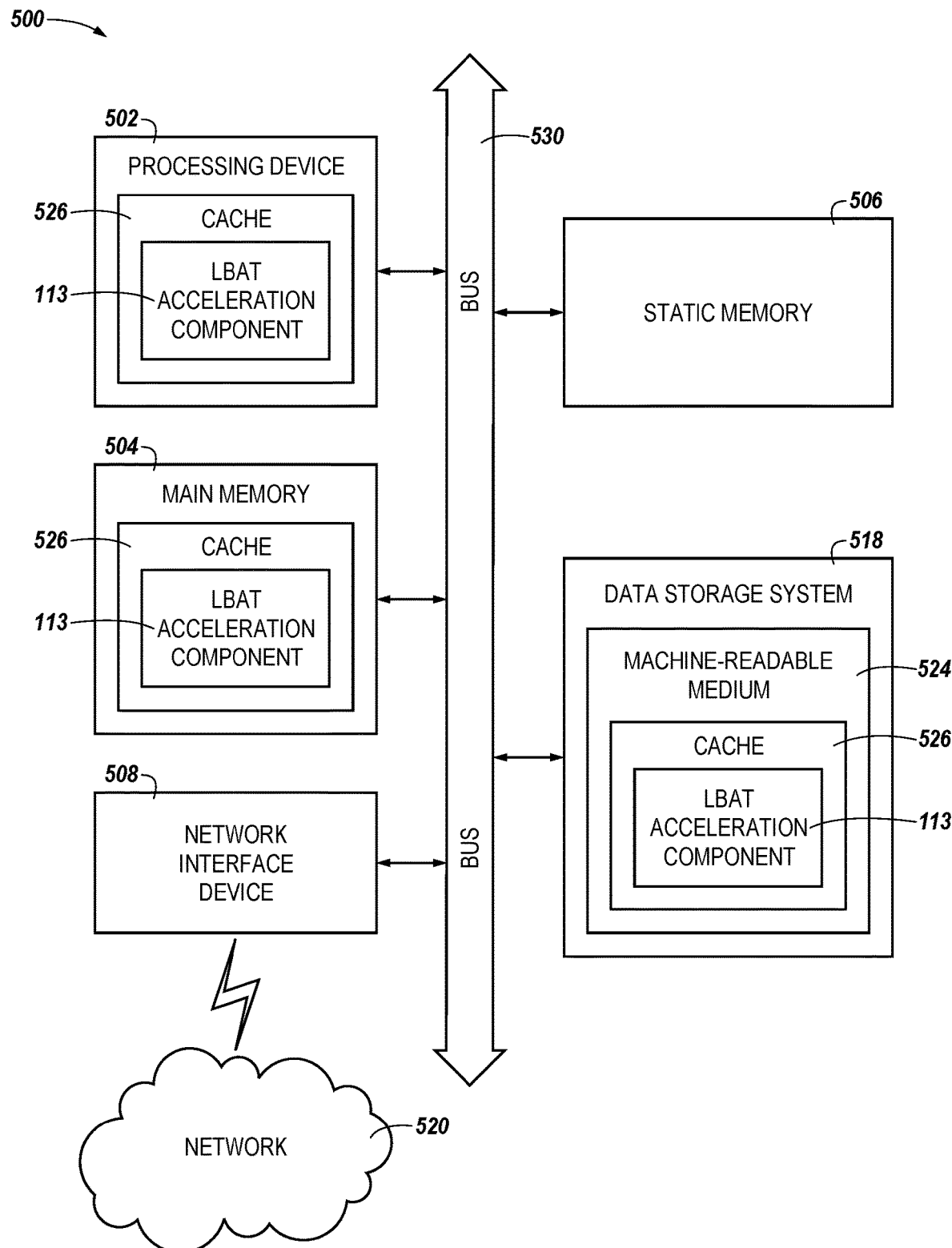
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the LBAT acceleration component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 426 include instructions to implement functionality corresponding to an LBAT acceleration component (e.g., the LBAT acceleration component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed:

1. A method, comprising:
receiving, by a processing device resident on a logical block address translation (LBAT) acceleration component that reads a codeword comprising multiple sequential logical to physical (L2P) data entries within a cache and makes a same change to all of the multiple sequential L2P data entries of the codeword without performing multiple read and write operations, signaling indicative of performance of an operation to update the plurality of L2P data entries, wherein the plurality of L2P data entries correspond to data written to a memory device, and wherein the plurality of L2P data entries have a same offset from an initial physical address corresponding to each of the plurality of L2P data entries; and
performing the operation to write the update to the plurality of L2P data entries of the codeword responsive to receiving the signaling indicative of performance of the operation to update the plurality of L2P data entries.

2. The method of claim 1, further comprising performing the operation to write the update to the plurality of L2P data entries of the codeword in the absence of receipt of signaling subsequent to the signaling indicative of performance of the operation to update the plurality of L2P data entries.

3. The method of claim 1, further comprising performing the operation to write the update to the plurality of L2P data entries of the codeword such that a subset of bits of each of the plurality of L2P data entries are updated.

4. The method of claim 1, wherein the processing device is coupled to the cache.

5. The method of claim 1, further comprising marking each L2P data entry of the plurality of L2P data entries using a write mask data value.

6. The method of claim 1, wherein the cache is resident on the LBAT acceleration component.

7. The method of claim 1, wherein the plurality of L2P data entries of the codeword comprise a L2P data entry that crosses a codeword boundary such that a first portion of the data entry is in the codeword and a second portion of the data entry is in a different codeword.

8. The method of claim 7, further comprising ensuring the update to the plurality of L2P data entries that cross the codeword boundary are atomically accurate in both the codeword and the different codeword.

9. An apparatus, comprising:
a memory device; and
a logical block address translation (LBAT) acceleration component having a processor device coupled to the memory device that reads across multiple sequential logical to physical (L2P) data entries within a codeword stored in a cache resident on the LBAT acceleration component and makes a same change to all of the multiple sequential L2P data entries of the codeword without performing multiple read and write operations, wherein the LBAT acceleration component is configured to:
identify a plurality of sequential L2P data entries corresponding to data written to the memory device and having a same offset from an initial physical address corresponding to each of the plurality of sequential L2P data entries;
receive signaling to update fixed data sets corresponding to a sequential range of data addresses in the memory device;
read the sequential range of data addresses in the memory device;
mark the fixed data sets in the sequential range of data addresses in the memory device using a write mask data value; and
write an update to the fixed data sets in the memory device that have been marked with the write mask data value such that the update is written to each of the fixed data sets in the absence of a signaling subsequent to the signaling to update the fixed data sets.

10. The apparatus of claim 9, wherein the processing device is coupled to the cache, and wherein the processor and the cache are resident on the logical block address translation (LBAT) acceleration component.

11. The apparatus of claim 10, wherein the cache stores data to be written as part of writing the update.

12. The apparatus of claim 10, wherein the cache comprises DRAM and the codeword is a DRAM codeword.

13. The apparatus of claim 9, wherein the memory device comprises a non-volatile memory device.

14. The apparatus of claim 9, wherein the LBAT further comprises a flash logical address (FLA) look-up table.

15. A system, comprising:
a logical block address translation (LBAT) acceleration component that reads across multiple sequential logical to physical (L2P) data entries within a codeword and makes a same change to all of the multiple sequential L2P data entries without performing multiple read and write operations; and
a processing device, resident on the LBAT acceleration component, wherein the processing device is configured to:
identify a plurality of L2P data entries corresponding to data written to a memory device and having a same offset from an initial physical address corresponding to each of the plurality of L2P data entries;
receive signaling to update a plurality of fixed data sets corresponding to a sequential range of data addresses in the memory device;
read the sequential range of data addresses in the memory device; and
write the update to the plurality of the fixed data sets in the sequential range of data addresses in the memory device.

16. The system of claim 15, wherein the processing device is further configured to write the update to the plurality of fixed data sets in the absence of receiving a signaling subsequent to the signaling to update the plurality of fixed data sets.

17. The system of claim 15, wherein the processing device is further configured to mark the fixed data sets in the sequential range of data addresses in the memory device using a write mask data value.

18. The system of claim 15, wherein the processing device is further configured to ensure the update to the plurality of fixed data sets are correctly updated when the update crosses a codeword boundary.

19. The system of claim 15, wherein the sequential range of data addresses is set by a user.

20. The system of claim 15, wherein the processing device is configured to write the update to the plurality of the fixed data sets in the sequential range of data addresses in the memory device when at least one fixed data set among the plurality of fixed data sets crosses the codeword boundary such that are portions of at least the one fixed data set are atomically accurate across the codeword boundary.

* * * * *